United States Patent
House et al.

(10) Patent No.: US 7,584,632 B2
(45) Date of Patent: *Sep. 8, 2009

(54) METHOD OF INCREASING THE EFFECTIVENESS OF A FINING AGENT IN A GLASS MELT

(75) Inventors: Keith Leonard House, Corning, NY (US); Prantik Mazumder, Ithaca, NY (US); Irene M Peterson, Elmira Heights, NY (US); Susan Lee Schiefelbein, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 433 days.

This patent is subject to a terminal disclaimer.

(21) Appl. No.: 11/193,124

(22) Filed: Jul. 28, 2005

(65) Prior Publication Data

US 2007/0022780 A1  Feb. 1, 2007

(51) Int. Cl.
*C03B 5/193* (2006.01)
*C03B 5/16* (2006.01)
*C03B 5/18* (2006.01)
*C03B 5/183* (2006.01)
*C03B 5/225* (2006.01)
*C03B 5/23* (2006.01)
*C03B 5/235* (2006.01)

(52) U.S. Cl. ............ 65/134.5; 65/29.21; 65/134.1; 65/136.4

(58) Field of Classification Search .......... 65/29.21, 65/134.5, 136.4, 134.1, 134.9, 137

See application file for complete search history.

(56) References Cited

U.S. PATENT DOCUMENTS

| | | | | |
|---|---|---|---|---|
| 1,953,023 A * | 3/1934 | Mulholland | ................ | 65/136.1 |
| 2,331,052 A * | 10/1943 | Shadduck | ................. | 65/134.4 |
| 2,773,111 A * | 12/1956 | Arbeit et al. | ................ | 373/31 |
| 3,015,190 A | 1/1962 | Arbeit | .................... | 49/54 |
| 3,669,435 A | 6/1972 | Silverberg | ................ | 263/40 R |
| 3,716,349 A | 2/1973 | Deeg et al. | .................... | 65/32 |
| 3,811,858 A * | 5/1974 | Ernsberger et al. | ........ | 65/134.4 |
| 3,811,859 A | 5/1974 | Ernsberger | ................ | 65/135 |
| 3,811,860 A | 5/1974 | Nier | .......................... | 65/135 |
| 3,929,440 A | 12/1975 | Oldfield | ..................... | 65/32 |
| 3,960,532 A | 6/1976 | Lazet | ......................... | 65/22 |
| 4,652,293 A | 3/1987 | Samejima et al. | ........... | 65/134 |

(Continued)

FOREIGN PATENT DOCUMENTS

DE  10138109 A1 *  9/2002

(Continued)

OTHER PUBLICATIONS

Machine Translation of DE 10138109 A1.*

(Continued)

*Primary Examiner*—Carlos Lopez
*Assistant Examiner*—Cynthia Szewczyk
(74) *Attorney, Agent, or Firm*—Kevin M. Able (57) ABSTRACT

Feed materials are melted in a furnace to form a glass melt at a first temperature $T_1$, the glass melt containing at least one fining agent. The glass melt is cooled to a second temperature $T_2$ less than $T_1$, and an oxygen-containing gas is bubbled through the cooled melt. The glass melt is then re-heated to a third temperature $T_3$ equal to or greater than the first temperature $T_1$.

18 Claims, 4 Drawing Sheets

U.S. PATENT DOCUMENTS

| | | | | |
|---|---|---|---|---|
| 5,509,951 | A | 4/1996 | Baucke et al. | 65/134.6 |
| 6,334,337 | B1 | 1/2002 | Macedo et al. | 65/134.5 |
| 6,698,244 | B1 | 3/2004 | Römer et al. | 65/134.3 |
| 6,769,272 | B2 | 8/2004 | Roeth et al. | 65/134.9 |
| 6,810,689 | B2 | 11/2004 | Römer et al. | 65/134.1 |
| 6,854,291 | B2 | 2/2005 | Romer et al. | 65/134.5 |
| 6,871,514 | B2 | 3/2005 | Muschik et al | 65/33.9 |
| 2001/0039812 | A1 | 11/2001 | Romer et al. | 65/134.1 |
| 2002/0011080 | A1 | 1/2002 | Naka et al. | 65/66 |
| 2002/0023465 | A1 | 2/2002 | Ogino et al. | 65/134.4 |
| 2002/0035855 | A1 | 3/2002 | Romer et al. | 65/134.4 |
| 2002/0069673 | A1 | 6/2002 | Kunert et al. | 65/134.5 |
| 2002/0092325 | A1 | 7/2002 | Muschik et al. | 65/134.3 |
| 2002/0121113 | A1 | 9/2002 | Gohlke et al. | 65/134.4 |
| 2004/0107732 | A1 | 6/2004 | Smith et al. | 65/99.3 |
| 2004/0216490 | A1 | 11/2004 | Vetter | 65/134.4 |
| 2005/0050923 | A1 | 3/2005 | Grzesik et al. | 65/135.6 |
| 2006/0174655 | A1* | 8/2006 | Kobayashi et al. | 65/134.5 |
| 2007/0022780 | A1 | 2/2007 | House et al. | 65/29.21 |
| 2007/0209396 | A1* | 9/2007 | Kobayashi et al. | 65/134.9 |

FOREIGN PATENT DOCUMENTS

| | | |
|---|---|---|
| DE | 102 53 222 | 4/2003 |
| JP | 2003-54958 | 8/2001 |
| JP | 2004091307 | 3/2004 |
| WO | WO2005/012198 | 2/2005 |

OTHER PUBLICATIONS

Translation of DE 101 38 109 A1.*

G. Leichtfried, "Refractory Metals", Powder Metallurgy Data—Refractory, Hard, and Intermetallic Metals, 2002, Springer-Verlag, vol. 2A2, p. 12-1.*

Hanke K P et al., "Influence of Water Vapor on the formation of Bubbles in Sulfate Containing Glass Melts", Glastechnische Berichte, vol. 43, no. 12, Jan. 1, 1970 XP008026801, pp. 475-482.

Bauckc F G K, "Electrochemical Cells For On-Line Maeasurements of Oxygen Fugacities in Glass-Forming Melts", Glass Science and Technology, vol. 61, No. 4, Apr. 1, 1998, XP009074506, p. 87-90.

Jebsen-Marwedel, H. et al., "Glastechnishe Fabrikationsfehler", 1980, Springer, Berlin, XP002485375, pp. 242-243.

* cited by examiner

METHOD OF INCREASING THE EFFECTIVENESS OF A FINING AGENT IN A GLASS MELT

BACKGROUND OF THE INVENTION

1. Field of the Invention

This application is related to U.S. application Ser. No. 11/732,463, filed Apr. 3, 2007 and currently pending and PCT/US06/26909, filed Jul. 12, 2006 and currently pending.

2. Technical Background

Liquid crystal displays (LCDs) are flat panel display devices that include flat glass substrates or sheets. The fusion process is a preferred technique used to produce sheets of glass used in LCDs because the fusion process produces sheets whose surfaces have superior flatness and smoothness compared to sheet produced by other methods. The fusion process is described, for example, in U.S. Pat. Nos. 3,338,696 and 3,682,609, the contents of which are incorporated herein by reference.

Typically, LCDs are of the amorphous silicon ($\alpha$-Si) thin film transistor (TFT) or polycrystalline-silicon ($\rho$-Si or poly-Si) TFT type. Poly-Si has a much higher drive current and electron mobility, thereby increasing the response time of the pixels. Further, it is possible, using $\rho$-Si processing, to build the display drive circuitry directly on the glass substrate. By contrast, $\alpha$-Si requires discrete driver chips that must be attached to the display periphery utilizing integrated circuit packaging techniques.

The evolution from $\alpha$-Si to $\rho$-Si has presented a major challenge to use of a glass substrate. Poly-Si coatings require much higher processing temperatures than do $\alpha$-Si, in the range of 600-700°. Thus, the glass substrate must be thermally stable at such temperatures. Thermal stability (i.e. thermal compaction or shrinkage) is dependent upon both the inherent viscous nature of a particular glass composition (as indicated by its strain point) and the thermal history of the glass sheet as determined by the manufacturing process. High temperature processing, such as required by poly-Si TFTs, may require long annealing times for the glass substrate to ensure low compaction, e.g. 5 hours at 600° C. These needs have driven glass manufacturers to search for higher melting point glasses. However, high melting point, high strain point glasses present several manufacturing challenges. To begin, the glass should be compatible with current manufacturing methods.

Conventional glass manufacturing processes for LCD glass typically begin by melting glass precursors—feed materials—in a melting furnace. Reactions which occur during this melting stage release gases which form bubbles (also referred to as seeds or blisters) in the glass melt. Seeds may also be generated by interstitial air trapped between particles of the feed materials. In any event, these gas bubbles must be removed in order to produce high quality glass. The removal of gaseous inclusions is generally accomplished by "fining" the glass. For clarity, gaseous inclusions formed as a result of the melting process, whether as reaction products or interstitial gases, will be referred to hereinafter as "seeds".

A common method of fining a glass melt is by chemical fining. In chemical fining, a fining agent is introduced into the glass melt, such as by addition to the feed material. The fining agent is a multivalent oxide that is reduced (loses oxygen) at high temperatures, and is oxidized (recombines with oxygen) at low temperatures. Oxygen released by the fining agent may then diffuse into the seeds formed during the melting process causing seed growth. The buoyancy of the seeds is thereby increased, and they rise to the surface of the glass where the gas is released out of the melt. Ideally, it is desirable that the fining agent release oxygen late in the melting process, after most of the seeds have formed, thereby increasing the effectiveness of the fining agent. To that end, although large seeds may be eliminated in the melter, the glass typically undergoes additional fining in a fining vessel, where the temperature of the glass is increased above the melting temperature. The increase in temperature of the glass melt within the fining vessel reduces the viscosity of the glass, making it easier for seeds in the melt to rise to the surface of the glass, and an oxide fining agent will release oxygen to the melt to cause seed growth and assist with the seed removal process. Once the melt has been fined, it may be cooled and stirred to homogenize the melt, and thereafter formed, such as into a glass sheet, through any one of a variety of available forming methods known in the art.

Many glass manufacturing processes employ arsenic as a fining agent. Arsenic is among the highest temperature fining agents known, and, when added to the molten glass bath in the melter, it allows for $O_2$ release from the glass melt at high temperatures (e.g., above 1450° C.). This high temperature $O_2$ release, which aids in the removal of seeds during melting and in particular during the fining stages of glass production, coupled with a strong tendency for $O_2$ absorption at lower conditioning temperatures (which aids in the collapse of any residual gaseous inclusions in the glass), results in a glass product essentially free of gaseous inclusions.

From an environmental point of view, it would be desirable to provide alternative methods of making glass, and particularly high melting point and strain point glasses typically employed in the manufacture of LCD glass, without having to employ arsenic as a fining agent. Arsenic-containing compounds are generally toxic, and processing of glass with arsenic results not only in manufacturing wastes that are expensive to process, but also creates disposal issues relative to the display device itself after the useful life of the device is exhausted. Unfortunately, many alternative fining agents typically release less oxygen, and/or at too low a temperature, and reabsorb too little $O_2$ during the conditioning process relative to established fining agents such as arsenic, thereby limiting their fining and oxygen re-absorption capabilities. Thus, during the fining stage of the glass production process (i.e. while the glass is within the fining vessel), the fining agent may produce an insufficient quantity of oxygen to effectively fine the glass within the fining vessel.

It would therefore be beneficial to find a process which enables the use of alternative fining agents, particularly for high melting temperature glasses.

SUMMARY

In a broad aspect of the present invention, raw feed materials are heated and melted at a first temperature $T_1$. The resultant glass melt is then cooled to a second temperature $T_2$ less than $T_1$, and a first oxygen-containing gas is introduced into the cooled glass melt at the second temperature $T_2$. The cooled glass melt is then heated to a third temperature $T_3$ equal to or greater than the first temperature $T_1$.

The oxygen-containing gas may be essentially pure oxygen. However, in some instances, the oxygen may be introduced in conjunction with one or more other gases. For example, the oxygen may comprise an air mixture. In a preferred embodiment, a noble gas is also bubbled into the cooled glass melt. The noble gas may be introduced into the cooled glass melt concurrently with the oxygen, either separately or mixed with the oxygen, or introduced at a separate time, such as before the oxygen is introduced. Helium is a preferred noble gas as helium has a high diffusivity in the glass melt.

While not necessary, it is nevertheless desirable that the second temperature is at least 50° C. less than the first temperature. Preferably, the cooled molten glass has a residence time of greater than about 15 minutes during the time the oxygen-containing gas is being introduced into the glass; more preferably the residence time is about 0.5 hours; and most preferably greater than about 1.5 hours.

In one embodiment, a method of fining glass is described comprising the steps of heating a feed material to form a molten glass at a first temperature $T_1$, the molten glass comprising a multivalent oxide material, cooling the molten glass to a second temperature $T_2$ less than $T_1$, bubbling a first gas comprising oxygen through the cooled molten glass at the second temperature, and heating the cooled molten glass to a third temperature $T_3 \geq T_1$. The first gas preferably comprises oxygen in an amount greater than about 5% by volume; more preferably in an amount greater than about 20% by volume. To ensure adequate introduction of the oxygen into the glass melt, it is desirable that a viscosity of the cooled molten glass is less than about 1000 poise.

In some preferred embodiments, a second gas, or mixture of gases, may be introduced into the glass melt. Preferably, the second gas comprises a noble gas, for example helium. The noble gas is introduced into the glass melt while the melt is at the second temperature such as by bubbling the noble gas into the glass melt. Preferably, the molten glass is maintained at the second temperature $T_2$ greater than about 15 minutes.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods, features and advantages be included within this description, be within the scope of the present invention, and be protected by the accompanying claims.

DETAILED DESCRIPTION

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

In a typical glass making process raw feed materials are heated in a furnace (melter) to form a viscous mass, or glass melt. Furnaces are generally constructed from refractory blocks comprised of burned flint clay, sillimanite, zircon or other refractory material. The feed materials may be introduced into the melter either by a batch process, wherein the glass forming constituents are mixed together and introduced into the melter as a discrete load, or the feed materials are mixed and introduced into the melter continuously. The feed materials may include cullet. The feed materials may be introduced into the melter through an opening or port in the furnace structure, either through the use of a push bar, in the case of a batch process, or in the case of a continuous feed melter, a screw or auger apparatus. The amount and type of feed material constituents makes up the glass "recipe". Batch processes are typically used for small amounts of glass and used in furnaces having a capacity on the order of up to a few tons of glass, whereas a large commercial, continuous feed furnace may hold in excess of 1,500 tons of glass, and deliver several hundred tons of glass per day.

The feed materials may be heated in the melter by a fuel-oxygen flame issuing from one or more burners above the feed material, by an electric current passed between electrodes typically mounted in the interior melter walls, or both. A crown structure above the walls, also made from refractory block, covers the melter and, in a combustion-heated furnace, provides a space for combustion of the fuel.

In some processes, the feed materials are first heated by a fuel-oxygen flame, whereupon the feed materials begin to melt and the resistivity of the feed materials decreases. An electric current is thereafter passed through the feed materials/melt mixture to complete the heating process. During the heating, reaction of the feed materials releases a variety of gases which form inclusions, commonly referred to as blisters or seeds, within the glass melt. Seeds may also form as a result of air trapped within the interstitial spaces between the particles of feed material, and from dissolution of the refractory blocks themselves into the melt. The gases which may constitute seeds may comprise, for example, any one or a mixture of $O_2$, $CO_2$, CO, $N_2$ and NO. Other gases may also be formed and comprise a seed. Water is also a frequent by-product of the melting process.

During the initial stages of melting, the glass melt forms a foamy mass within the melter. Unless seeds are removed, they may be carried through the remainder of the glass forming operations, eventually becoming frozen into the final glass product and resulting in visible imperfections in the product. Foam at the top of the melt may be prevented from exiting the melter by skimming the melt with "floaters" or a bridge wall within the melter. Large seeds within the melt may rise to the surface of the melt, where the gases contained within the seeds are thereby released from the molten glass. Convection currents arising from thermal gradients in the melt aid in homogenizing the melt. However, the residence time of the glass melt in the melter may be insufficient for smaller seeds to be eliminated.

To ensure maximum seed removal, glass manufacturers commonly employ a chemical fining process wherein a fining agent may be included among the feed materials. The fining mechanism of a fining agent is to generate gas in the melt and establish a concentration difference between the gas in the melt and the gas in the seeds to drive seed growth.

Arsenic, typically in the form $As_2O_5$ has been used for years as a fining agent. $As_2O_5$ is believed to achieve seed-free glass by reducing the arsenic from +5 to +3 at high temperature, after most melting is complete. This reduction releases oxygen into the melt that diffuses into the seeds, causing the seeds to grow and rise through and out of the melt. Arsenic has the additional advantage of assisting in the removal of any seeds that may remain in the glass during the conditioning or cooling cycle of the glass by reabsorbing excess oxygen. As such, arsenic is an outstanding fining agent, producing glass virtually free of gaseous inclusions with very little intervention.

Unfortunately, arsenic is a toxic material, one of the 8 listed heavy metals in the Resource Conservation and Recovery Act (RCRA). The processing of glass with arsenic results in wastes that are expensive to process and creates disposal issues relative to the display device itself after the useful life of the device is exhausted.

Antimony oxide ($Sb_2O_5$) may also be utilized as a substitute for arsenic, but antimony is closely related to arsenic in terms of chemical behavior and therefore possesses many of the same challenges as arsenic, such as for waste disposal.

Tin oxide ($SnO_2$) is another fining agent which has seen use in glass production. However, although tin oxide undergoes similar redox reactions as arsenic, the very low solubility of tin oxide (approx. 0.2 wt. %) at the forming temperature of display glasses (approximately 1200° C.) limits how much can be added to the batch and therefore the amount of oxygen available for fining. Thus, in conventional glass making processes, tin oxide has limited effectiveness as a chemical fining agent.

The concept of glass which is essentially antimony and/or arsenic-free (e.g. having less than about 0.05 wt. % of antimony or arsenic) has been previously described. For example, U.S. Pat. No. 6,128,924, the contents of which are hereby incorporated by reference, discloses a group of fining agents that may be employed alone or in some combination as a substitute for arsenic for the production of glasses useful for the fabrication of LCD displays. This group includes: $CeO_2$, $SnO_2$, $Fe_2O_3$ and halide containing compounds. Indeed, U.S. Pat. No. 6,468,933 describes a glass forming process that employs a mixture of $SnO_2$ and a halide-containing compound in the form of a chloride (e.g., $BaCl_2$ or $CaCl_2$) as fining agents in a system essentially free of arsenic and antimony.

The inventors herein propose a method for enhancing the effectiveness of fining agents, such as, for example, tin oxide, in the formation of a glass. The method broadly comprises forming a glass melt containing a multivalent oxide fining agent at a first temperature, cooling the glass melt to a second temperature less than the first temperature, introducing an oxygen-containing gas into the cooled glass melt at the second temperature, and heating the cooled glass melt to a third temperature higher than the first temperature.

Figure 1:
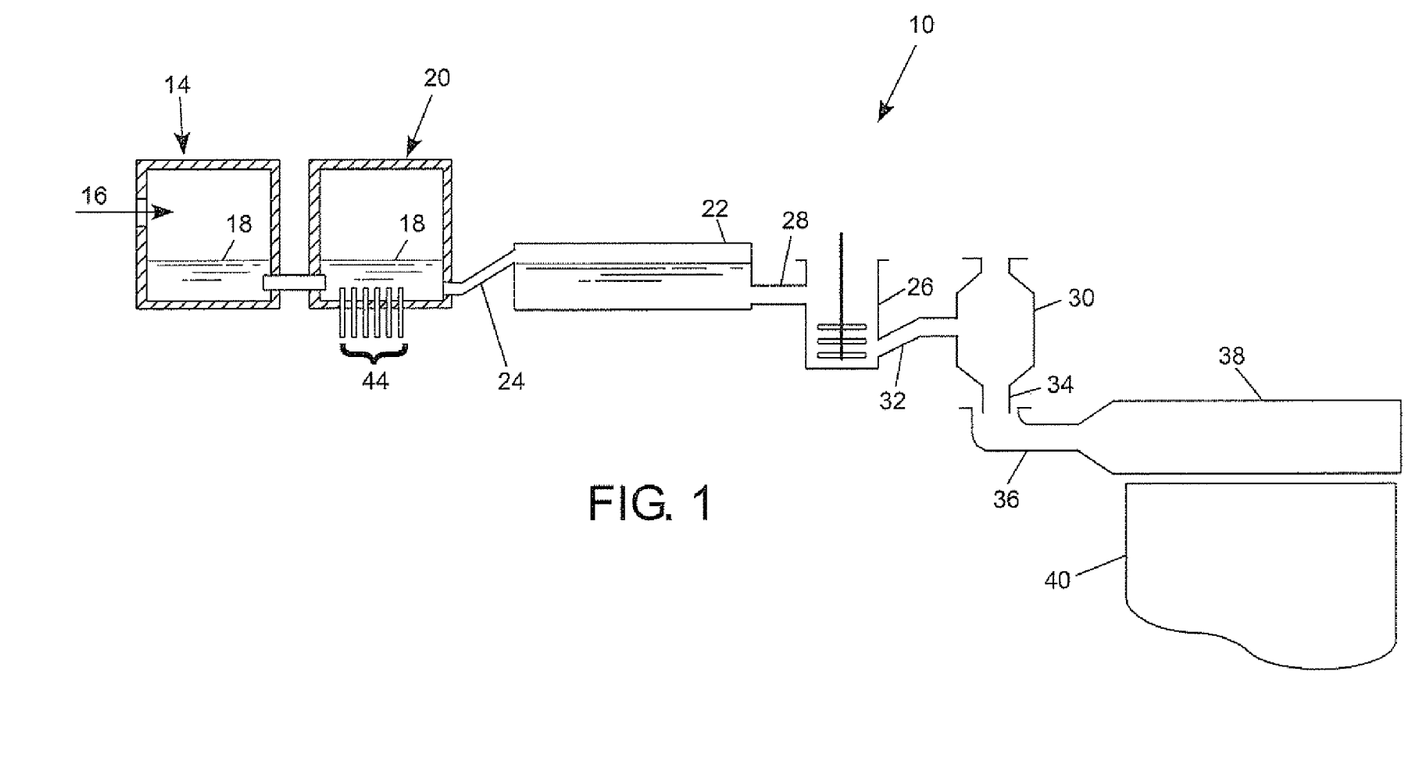
FIG. 1 is a cross sectional side view of a glass melting process.

Referring to FIG. 1, there is shown a schematic view of an exemplary glass manufacturing system 10 in accordance with an embodiment of the present invention that uses a fusion process to make glass sheets. The fusion process is described, for example, in U.S. Pat. No. 3,338,696 (Dockerty). The glass manufacturing system 10 includes a melting furnace 14 (melter 14) in which raw feed materials are introduced as shown by arrow 16 and then melted to form molten glass 18. Also included is cooling vessel 20. The glass manufacturing system 10 further includes components that are typically made from platinum or platinum-containing metals such as platinum-rhodium, platinum-iridium and combinations thereof, but which may also comprise such refractory metals as molybdenum, palladium, rhenium, tantalum, titanium, tungsten, or alloys thereof. The platinum-containing components may include fining vessel 22 (e.g. finer tube 22), a cooling vessel to finer connecting tube 24, a mixing vessel 26 (e.g. stir chamber 26), a finer to stir chamber connecting tube 28, a delivery vessel 30 (e.g. bowl 30), a stir chamber to bowl connecting tube 32, a downcomer 34 and an inlet 36. Inlet 36 is coupled to forming vessel 38 (e.g. fusion pipe 38) which forms glass sheet 40. Typically, forming vessel 38 is made from a ceramic or glass-ceramic refractory material.

Figure 3:
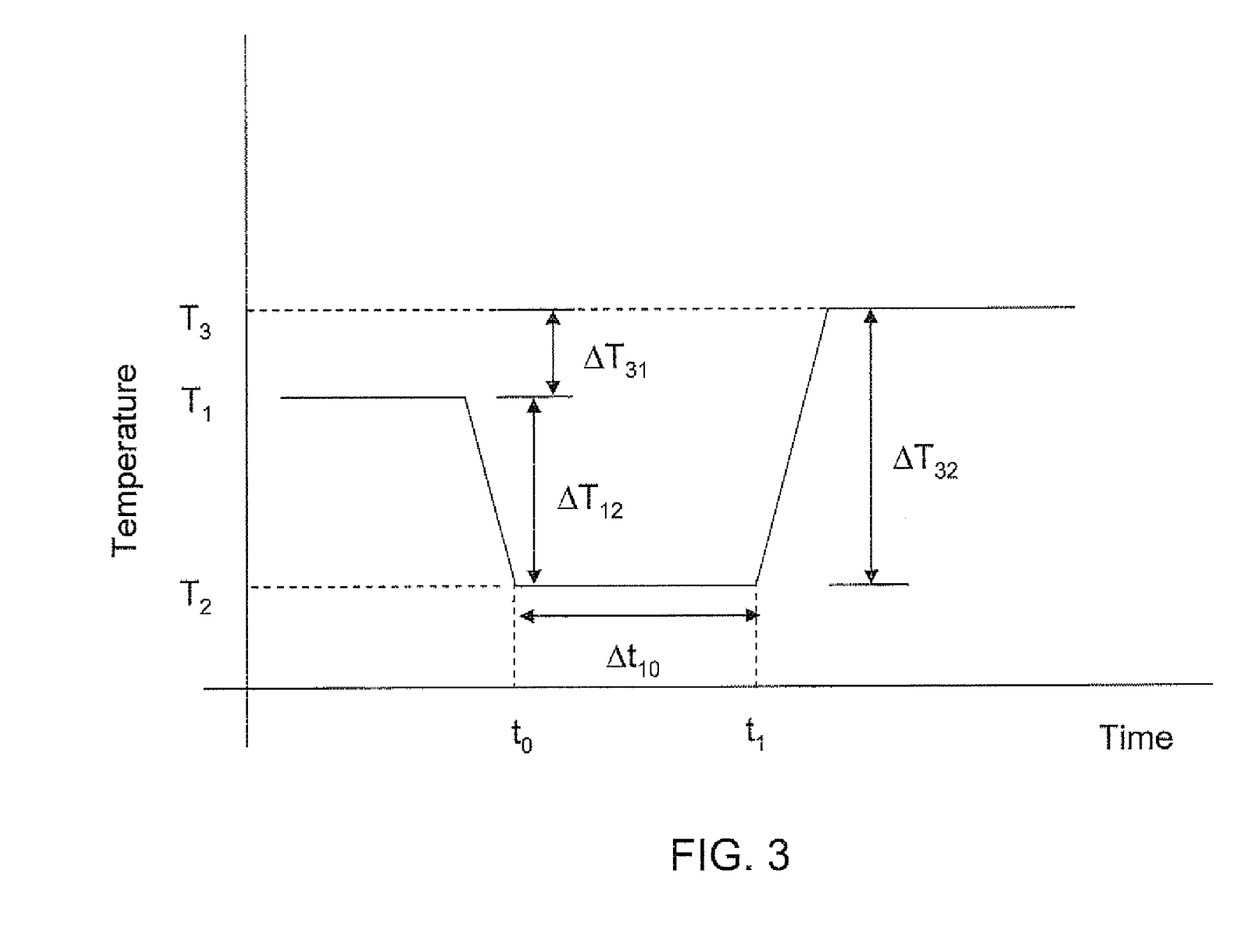
FIG. 3 is a chart showing an exemplary temperature vs. time heating-cooling-reheating schedule for a glass melt in accordance with an embodiment of the present invention.

Glass raw materials are fed into melting furnace 14 in accordance with a recipe specific to the desired glass composition. The raw feed materials may be fed in a batch mode or via a continuous method, and may include, but are not limited to, oxides of Si, Al, B, Mg, Ca, Zn, Sr, or Ba. Feed materials may also be cullet from previous melting operations. As depicted in FIG. 3, the raw feed materials are heated within melting furnace 14 and melted to form glass melt 18 at a first temperature $T_1$. First temperature $T_1$ may vary depending upon the specific glass composition. For display glasses, and in particular hard glasses (i.e. glass having a high melting temperature), melting temperatures may be in excess of 1550° C.; more typically at least about 1600° C. A multivalent fining agent, such as $SnO_2$, may be included in the initial feed materials, or may be subsequently added to the melt. Alternatively, in the case of $SnO_2$ in particular as a fining agent, it may be unnecessary to add the $SnO_2$ to the feed materials, as the electrode material in a melting furnace which incorporates electrically heated melting is often comprised of $SnO_2$. Thus, sufficient $SnO_2$ may be added to the melt through the gradual disintegration of the electrodes.

The feed materials may be heated by conventional glass-making methods. For example, the feed materials may be initially heated by way of combustion burners located over the surface of the feed materials. Once a suitable temperature has been attained through the use of combustion burners such that the resistivity of the melt is sufficiently lowered, an electric current may thereafter be passed through the body of the melt between electrodes to heat the melt from within.

Figure 2:
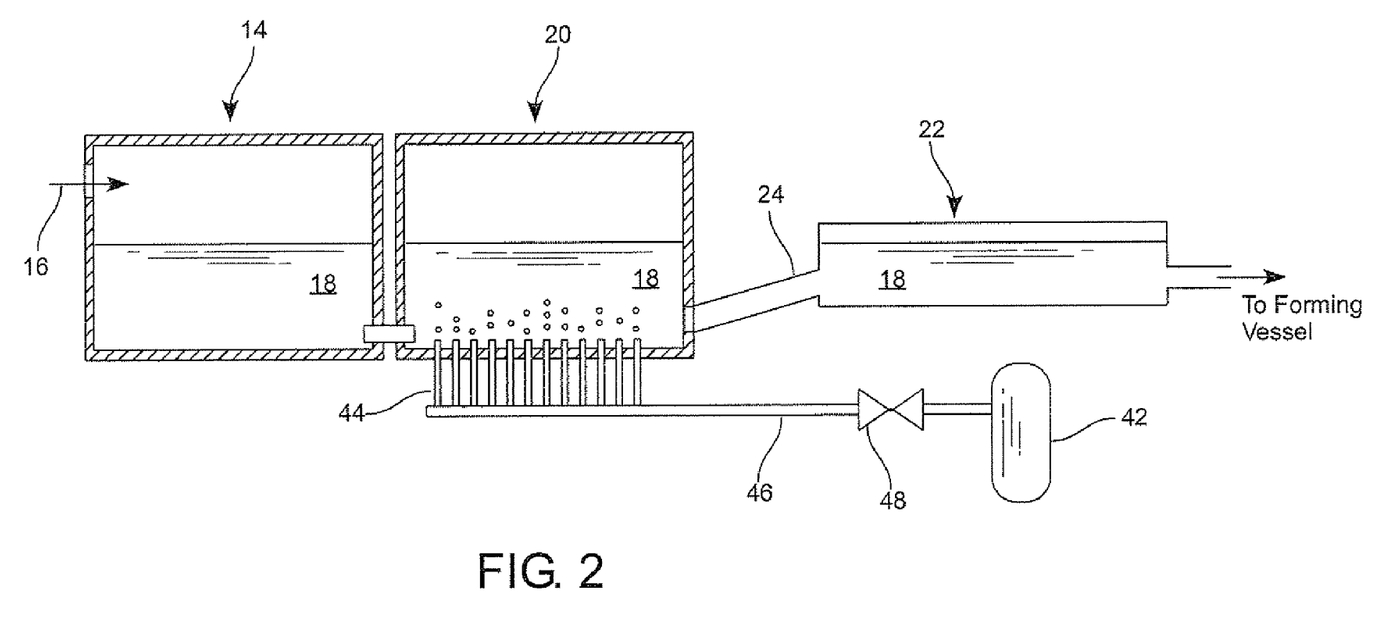
FIG. 2 is a cross sectional side view of a portion of the glass melting process of FIG. 1.

In accordance with the present embodiment, once the raw feed materials have been melted at the first temperature $T_1$, the glass melt is cooled to a second temperature $T_2$ less than $T_1$, and a gas comprising oxygen is introduced into the cooled melt, such as by bubbling. The temperature difference between $T_1$ and $T_2$ is $\Delta T_{12}$ in FIG. 3. The glass melt may be cooled in a vessel separate from melting furnace 14, such as cooling vessel 20 depicted in FIG. 2, or the glass melt may be cooled within the confines of the melting furnace. For example, melter 14 may include compartments or baffles such that one portion of the melter is at least partially segregated from another portion of the melter. As depicted in FIG. 2, the oxygen-containing gas may be supplied to cooling vessel 20 under pressure from gas supply tank 42 to injection tubes 44 through gas header 46. Valve 48 may be used to control the flow of oxygen-containing gas to the glass melt, and may be manually or remotely/automatically controlled. The size of the oxygen-containing gas bubbles introduced into the glass melt through tubes 44 are desirably in a range from about 1 mm in diameter to about 40 mm in diameter, with a typical diameter being about 10 mm. As shown, the oxygen-containing gas is introduced from the bottom of cooling vessel 20. However, the oxygen-containing gas may be introduced from other orientations, such as through tubes entering the melt through the upper surface of the melt or through the sides of cooling vessel 20. In some embodiments, the oxygen-containing gas may be pulsed into the melt rather than introduced at a constant flow rate. That is, the flow of gas is started and stopped at a pre-determined frequency. The frequency of pulses must be sufficiently slow to allow the preceding bubble to ascend away from the outlet of the supply tube and prevent the subsequent bubbles from coalescing at the output of the supply tube.

Without wishing to be bound by theory, it is believed that initially the concentration of the valance states of the multivalent fining agent are in equilibrium at given temperature and a given partial pressure of oxygen in the melt. This equilibrium is controlled by an equilibrium constant which is a function of these three parameters—melt temperature, the ratio of the valance state concentrations of the multivalent oxide fining agent (i.e. the redox ratio, which is equal to the concentration of reduced fining agent divided by the concentration of oxidized fining agent), and the partial pressure of oxygen. That is, for a given melt temperature and partial pressure of oxygen, there is a corresponding redox ratio. The lower the redox ratio, the more oxygen the fining agent holds. In a conventional glass making operation, the glass melt is formed at the first, melting temperature (e.g. $T_1$), and is then heated to a second, fining temperature (e.g. $T_2$) higher than the first temperature. The temperature increase from $T_1$ to $T_2$ results in reduction of the fining agent, an increase in the redox ratio, and release of oxygen into the melt. In accordance with the present invention, the temperature of the glass melt is lowered from the first temperature $T_1$ to a second temperature $T_2$ lower than the first temperature, thus creating a driving force for oxidation of the fining agent. An oxygen-containing gas is introduced into the glass melt, decreasing the redox ratio as the fining agent combines with the oxygen. In effect, loading the fining agent with oxygen. The glass melt is then heated to a third temperature higher than the first temperature, driving the fining agent to release this oxygen. Oxygen released from the fining agent may then diffuse into the melt, and the seeds, causing the seeds to grow and rise to the surface of the melt.

It should be noted that simply reducing the temperature of the melt, without supplying additional oxygen to the melt, does nothing to enhance the effectiveness of the fining agent. Similarly, introducing oxygen at the first temperature is not nearly as useful as introducing the oxygen after cooling the molten glass. For a given oxygen-containing gas, bubbling at lower temperatures allows the fining agent to store more oxygen than is possible at higher temperatures. Advantageously, the invention decouples the melting and bubbling steps. Melting is done at higher temperatures where it is most efficient (e.g. dissolution kinetics increase with temperature), and bubbling is done at lower temperatures where it is most useful.

In some embodiments the oxygen-containing gas may be pure oxygen. In a preferred embodiment, the gas includes oxygen mixed with one or more other gases. For example, air has been found to produce effective fining of the glass melt. However, the oxygen is preferably mixed with any one or more of the noble (inert) gases, for example, Ar, Xe, Ne, He, Kr, $N_2$ or mixtures thereof under the condition that the partial pressure of oxygen within the mixed-gas bubble exceeds the partial pressure of oxygen within the melt. Advantageously, the use of a noble gas (or mixture thereof), may be used to control the partial pressure of oxygen within the pre-existing seeds. That is, by increasing or decreasing the ratio of noble gas to oxygen, the partial pressure of oxygen within the introduced bubble may be controlled. The noble gas diffuses readily within the melt and into a seed. The partial pressure of oxygen within the seeds is subsequently reduced (the existing gas concentrations within the seed are diluted), thereby increasing the amount of oxygen diffusion into the seeds: the seeds grow in volume and rise to the surface of the melt. Because the diffusivity of helium within the glass melt is especially high relative to the other inert gases, on the order of $3.3 \times 10^{-7} \ast \exp(-4931/T)$, where T is the temperature in Kelvin, helium is a preferred noble gas. The noble gas may be introduced into the cooled molten glass as a mixture with oxygen, or the noble gas may be introduced into the cooled molten glass separately. That is, it is not necessary that both the noble gas and the oxygen be introduced as a mixture, or even contemporaneously. The introduction of noble gas into the cooled molten glass may begin before the introduction of oxygen and be completed prior to the introduction of the oxygen, or continued during the introduction of oxygen.

As described above, the gas bubbles introduced into the glass melt (including the oxygen-containing gas, or oxygen and a noble gas separately) serve as reservoirs for gases which enhance glass fining through at least three mechanisms. In the first case, if a noble gas such as helium is introduced into the cooled glass melt prior to or contemporaneously with (mixed or not) the oxygen-containing gas, a low partial pressure of the noble gas within the glass melt causes the noble gas to diffuse from the introduced bubble into the melt. The noble gas eventually encounters pre-existing seeds, and diffuses into the seeds. The seeds grow and rise to the surface of the melt. Thus, the noble gas may serve as a physical fining agent.

In the second case, noble gas introduced into the melt may diffuse into pre-existing seeds, thereby reducing the partial pressure of any oxygen within the pre-existing seed to below the partial pressure of oxygen introduced through bubbling. The reduced partial pressure of oxygen within the pre-existing seeds results in additional diffusion of oxygen into the seeds from the bubbled oxygen, thereby further causing seed growth.

In the third case, if the partial pressure of oxygen in the introduced bubble is greater than the partial pressure of oxygen of the melt, oxygen diffusing from the introduced bubble into the glass melt becomes available to replenish (combine with) the fining agent and decrease the redox ratio. The case of tin oxide as a fining agent is given in the equation below as an example of a redox (reduction-oxidation) equation.

$$SnO_2 \Leftrightarrow SnO + \frac{1}{2}O_2 \quad (1)$$

As the temperature of the melt is increased, equation (1) is driven to the right, reducing the tin and releasing oxygen into the glass melt. A decrease in temperature drives the equation to the left, oxidizing the tin. It should be noted, however, that oxygen is required to oxidize the tin. If sufficient $O_2$ is not available, cooling the melt from $T_1$ to $T_2$ may result in a decrease in the melt $PO_2$ and essentially no change in the relative amounts of SnO to $SnO_2$ (i.e. the redox ratio). The supply of oxygen from introduced bubbles thereby provides the oxygen-depleted fining agent with a ready source of oxygen with which to recombine, thereby replenishing the fining agent. In essence, reducing the temperature of the glass melt provides the force necessary to drive redox equation (1) to the left, and introducing oxygen into the melt facilitates the reaction.

Although it is desirable to reduce the glass melt temperature to as low a second temperature $T_2$ as possible prior to introducing the oxygen-containing gas, thereby maximizing $\Delta T_{12}$ and recombining as much fining agent with oxygen as possible, the viscosity of the glass during the bubbling/cooling phase must be sufficiently low that the introduced gas bubbles will form within the glass melt, and allow sufficient oxygen, and inert gas (if used), to diffuse into the melt. A typical value for $\Delta T_{12}$ is at least about 50° C. However, the temperature of the glass melt during the bubbling/cooling phase, $T_2$, should be such that the viscosity of the glass melt is less than about 1000 poise. Above 1000 poise, the viscosity of the glass may be too high for effective diffusion of the oxygen or oxygen and the noble gas to take place, and it may become difficult or impossible to bubble adequate gas into the melt.

Figure 4:
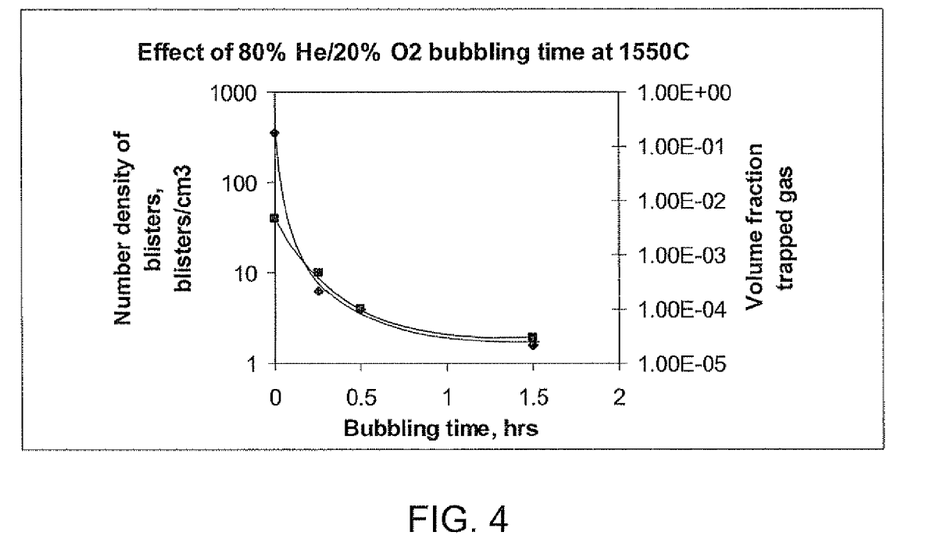
FIG. 4 is a chart showing final blister density and gas volume fraction as a function of bubbling time for an oxygen-containing gas into a glass melt at a cooled temperature.

It is also equally desirable that the glass melt be maintained at second temperature $T_2$ for an amount of time ($\Delta t_{10}=t_1-t_0$) necessary to allow sufficient oxygen to diffuse into the melt. Obviously, the effectiveness of bubbling into the cooled melt is dependent upon the temperature (and therefore viscosity) of the glass melt, the volume fraction of gas which is introduced (bubbled), and the residence time at which the melt is maintained at the reduced second temperature $T_2$. FIG. 4 shows the results of an experiment where a glass melt comprising a fining agent (tin oxide) was made in accordance with the present invention and shows the reduction in seed count (diamonds) within the finished glass as a result of introducing a gas mixture of 80% by volume helium and 20% by volume oxygen into the cooled glass melt. The base glass was Corning Eagle 2000™. FIG. 4 also compares the volume fraction of gas trapped in the melt (squares) as a function of residence time at the reduced second temperature $T_2$ equal to 1550° C., and shows that at 1550° C., the density of seeds (blisters) in the resultant glass, as well as the volume fraction of gas trapped in the melt, are sharply reduced after a residence time $\Delta_{10}$ of about 15 minutes. After a residence time of about 1.5 hours at $T_2$ the density of seeds (blisters) within the melt is reduced still further.

Figure 5:
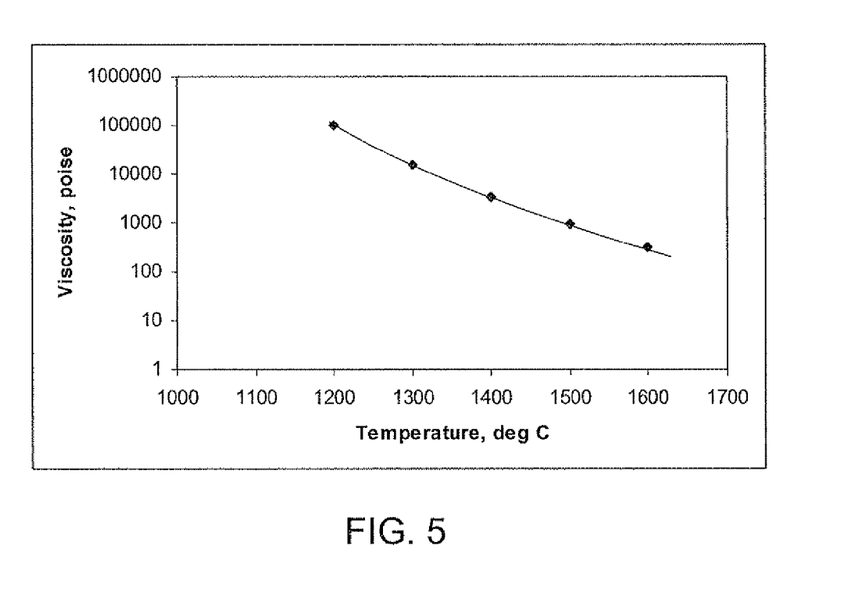
FIG. 5 is a chart showing viscosity as a function of temperature for Corning Eagle 2000™ glass.

FIG. 5 illustrates the temperature-viscosity curve for the glass melt of FIG. 4. As can be seen from FIG. 5, the viscosity of the glass at a second temperature $T_2$ of 1550° C. is about 1000 poise. Preferably, the oxygen-containing gas is bubbled into the glass melt at temperature $T_2$ for at least about 15 minutes; more preferably at least about one hour; most preferably at least about 1.5 hours. Preferably, the viscosity of the glass is less than about 1000 poise during the bubbling.

Once the cooling-bubbling phase has been completed, the glass melt is re-heated to a third temperature $T_3$ at least as high as first temperature $T_1$, and preferably greater than first temperature $T_1$. For a glass which has been melted at a temperature $T_1$ of about 1600° C., a typical $\Delta T_{31}$ ($=T_3-T_1$) is about 50° C. However, the value of $\Delta T_{31}$ will depend upon, among other factors, the glass composition. Preferably, $T_3$ is at least about 1600° C.; more preferably at least about 1650° C. The glass melt is preferably maintained at third temperature $T_3$ for at least about 15 minutes. Reheating of the glass melt may, for example, be undertaken in accordance with conventional fining operations as are known in the art, such as within fining vessel 22. While the melt is at third temperature $T_3$, the high temperature causes the fining agent to release oxygen. The oxygen released by the fining agent then becomes available to cause seed growth and removal of existing seeds in the glass melt. Once fining of the glass melt has been completed, the melt is flowed to the stir chamber for homogenization, and then to forming vessel 38 as in a conventional fusion glass making process.

In a conventional fusion glass making process, the molten glass is flowed to fusion pipe 38 (also known as an isopipe or forming wedge), where the glass overflows the upper edges of the fusion pipe. The glass then flows down along converging forming surfaces of the fusion pipe and the separate flows join along the apex of the converging forming surfaces to form a glass sheet. Accordingly, the glass which has been in contact with the converging forming surfaces forms the interior of the glass sheet, and the surface of the glass sheet remains pristine. As indicated earlier, a more detailed description of a fusion glass forming method and apparatus may be found in U.S. Pat. Nos. 3,338,696 and 3,682,609.

Although the invention has been described in detail for the purpose of illustration, it is understood that such detail is solely for that purpose and variations can be made therein by those skilled in the art without departing from the spirit and scope of the invention which is defined by the following claims. For example, although a fusion downdraw method has been used for illustrative purposes, the present invention is applicable to a wide range of glass-making methods. Similarly, the inventive method disclosed herein is not limited to the manufacture of liquid crystal display glass, or necessarily to high melting temperature glasses. Moreover, oxygen need not be introduced into the molten glass in a gaseous form. Oxygen may be introduced through the disassociation of water or through electrolytic methods, as are known in the art.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. For example, the inventive method disclosed herein could be used in glass making processes other than the fusion process (e.g. float glass processes), and for products other than glass sheets for display devices. All such modifications and variations are intended to be included herein within the scope of this disclosure and the present invention and protected by the following claims.

What is claimed is:

1. A method of making glass comprising:
   heating a feed material essentially free of arsenic or antimony in a furnace to form a molten glass at a first temperature $T_1$, the feed material comprising a multivalent fining agent, thereby chemically reducing the fining agent;
   cooling the molten glass in a cooling vessel to a second temperature $T_2$ that is at least 50° C. less than $T_1$;
   introducing a gas comprising oxygen into the cooled molten glass through an injection tube in the cooling vessel to oxidize the multivalent fining agent; and
   fining the cooled molten glass by heating the cooled molten glass in a fining vessel to a third temperature $T_3$ greater than $T_1$.

2. The method according to claim 1 wherein the oxygen containing gas further comprises a gas selected from the group consisting of Ar, Xe, Ne, He, Kr, $N_2$, and mixtures thereof.

3. The method according to claim 2 further comprising controlling a partial pressure of the introduced oxygen by varying an amount of the inert gas.

4. The method according to claim 1 wherein during the introducing step a viscosity of the cooled molten glass is less than about 1000 poise.

5. The method according to claim 1 wherein a residence time of the molten glass at the second temperature $T_2$ is at least about 1.5 hours.

6. The method according to claim 1 wherein the oxygen containing gas is introduced by bubbling.

7. The method according to claim 1 wherein the oxygen containing gas is introduced at a constant rate.

8. The method according to claim 1 wherein the oxygen containing gas is introduced by pulsing a flow of the oxygen containing gas.

9. The method according to claim 1 wherein the multivalent fining agent comprises $CeO_2$ or $SnO_2$.

10. The method according to claim 1 wherein the fining vessel comprises platinum.

11. The method according to claim 1 wherein the introducing the oxygen containing gas decreases a redox ratio of the fining agent.

12. A method of making glass comprising a) heating a batch material comprising tin in a first vessel to form a molten glass at a first temperature $T_1$, wherein the tin is chemically reduced at the first temperature;

b) cooling the molten glass in a second vessel to a second temperature $T_2$ that is at least 50° C. less than $T_1$;

c) introducing a gas comprising oxygen into the molten glass at the second temperature to oxidize the tin;

d) heating the molten glass to a third temperature $T_3$ in a third vessel to chemically reduce the tin and release oxygen into the molten glass, where $T_3 \geqq T_1$.

13. The method according to claim 12 wherein the gas comprises a gas selected from the group consisting of Ar, Xe, Ne, He, Kr, $N_2$, and mixtures thereof.

14. A method of making glass comprising:

heating a feed material, the feed material essentially free of arsenic or antimony and comprising a multivalent fining agent, in a furnace to form a molten glass at a first temperature, the heating increasing a redox ratio of the multivalent fining agent;

cooling the molten glass in a cooling vessel to a second temperature at least 50° C. less than the first temperature;

decreasing the redox ratio of the fining agent by introducing a gas comprising oxygen into the cooled molten glass in the cooling vessel at the second temperature; and heating the glass to a third temperature equal to or greater than the first temperature to increase the redox ratio of the fining agent, thereby causing the multivalent fining agent to release oxygen into the molten glass.

15. The method according to claim 14 wherein the gas comprises a noble gas and further comprising controlling an oxygen partial pressure of the gas by varying an amount of the noble gas.

16. The method according to claim 15 wherein the oxygen partial pressure of the gas is greater than a partial pressure of oxygen in the cooled molten glass.

17. The method according to claim 14 wherein the multivalent fining agent comprises $CeO_2$ or $SnO_2$.

18. The method according to claim 14 wherein a residence time of the molten glass at the second temperature is at least about 1.5 hours.

* * * * *

UNITED STATES PATENT AND TRADEMARK OFFICE
CERTIFICATE OF CORRECTION

PATENT NO.        : 7,584,632 B2
APPLICATION NO.   : 11/193124
DATED             : September 8, 2009
INVENTOR(S)       : Keith Leonard House et al.

It is certified that error appears in the above-identified patent and that said Letters Patent is hereby corrected as shown below:

| Col. | Line | Description |
|---|---|---|
| 8 | 51 | Please delete "$PO_2$" and add "$pO_2$" |
| 9 | 29 | Please delete "$\Delta_{10}$" and add "$\Delta t_{10}$" |

Signed and Sealed this

Fifteenth Day of December, 2009

David J. Kappos
*Director of the United States Patent and Trademark Office*